United States Patent
Momtaz et al.

(10) Patent No.: US 6,204,980 B1
(45) Date of Patent: Mar. 20, 2001

(54) HIGH SPEED GAIN STAGE WITH DC OFFSET CANCELLATION FOR SERVO DEMODULATOR CIRCUIT

(75) Inventors: Afshin D. Momtaz, Irvine; Mario T. Caresosa, Rancho Santa Margarita, both of CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/099,666

(22) Filed: Jun. 18, 1998

(51) Int. Cl.$^7$ ........................................... G11B 5/02
(52) U.S. Cl. ........................... 360/29; 360/67; 360/77.08; 363/125; 363/127; 330/252
(58) Field of Search ................... 360/77.08, 29, 360/46, 67; 363/252, 125, 127

(56) References Cited

U.S. PATENT DOCUMENTS

| | | | |
|---|---|---|---|
| 4,491,777 | * | 1/1985 | Beck et al. ............................ 318/571 |
| 5,583,713 | * | 12/1996 | Real et al. ......................... 360/77.08 |
| 5,774,019 | * | 6/1998 | Koyama et al. ....................... 330/252 |
| 5,969,545 | * | 10/1999 | Assadian et al. ....................... 327/62 |

* cited by examiner

Primary Examiner—Hoa T. Nguyen
Assistant Examiner—Dan I. Davidson
(74) Attorney, Agent, or Firm—Martine Penilla & Kim, LLP

(57) ABSTRACT

An integrated circuit servo system demodulator that incorporates a high speed gain stage with DC offset cancellation. The gain stage receives a differential voltage signal representing a servo burst and converts the differential voltage signal to a differential current signal by a transconductance amplifier. The differential current signal is full-wave current rectified and converted to a full-wave rectified voltage signal by a transimpedance amplifier. A DC offset cancellation circuit is coupled between the full-wave current rectifier and transimpedance amplifier and functions to mirror and subtract, from the rectified current signal directed to the transimpedance amplifier, any DC leakage current developed by the rectifier which would generate a DC offset voltage through the transimpedance amplifier. The high speed gain stage with DC offset cancellation of the invention is suitable for use in implementing a precision servo demodulator for accurately recovering read/write transducer head position information.

18 Claims, 6 Drawing Sheets

HIGH SPEED GAIN STAGE WITH DC OFFSET CANCELLATION FOR SERVO DEMODULATOR CIRCUIT

FIELD OF THE INVENTION

The invention relates generally to improved signal processing circuitry for magnetic hard disk drive head positioning servo systems and, more particularly, it relates to a servo demodulator circuit with improved gain and rectification circuitry.

BACKGROUND OF THE INVENTION

Extensive efforts have been applied in the field of head positioning servo systems to developing improved techniques for ensuring that an active read/write head flies precisely over the centerline of a desired data track in order to minimize data read or data write errors and to further reduce track pitch in order to increase areal recording density. Improved techniques for increasing areal recording density have been an important enabling factor in the trend toward smaller yet higher capacity disk drives.

Areal recording density is generally expressed, analytically, in terms of the product of track density (the number of concentric tracks per radial inch) on the surface of a disk and the bit density (the number of bits per linear inch) that can be recorded along a given data track. As the track density increases, thereby reducing the spacing between tracks (track pitch), it is necessary to provide more precise radial positioning of an active read/write head over the centerline of the desired track.

Various types of head positioning servo systems have long been known in the field and pertinent such servo systems include a particular type, often referred to as an "embedded servo", in which each recording surface of a disk has particular arcuate locations termed "servo sectors" that are reserved for servo burst fields and that are not used for storing user data. During time spaced-apart intervals, in which a servo burst field is being read by an active head, the servo system has access to the information needed to determine whether or not the active read/write head is accurately positioned over the centerline of a desired data track. If it is determined that a position error exists, the servo system is able to effect an appropriate adjustment to the active read/write head to cause the active head to fly over the centerline of the desired track.

During operation of such an embedded servo system, an active read/write head flies above a servo sector and reads sequential servo burst fields during a sequence of time windows in order to produce a servo read signal. Signal processing circuitry responds to the servo read signal in order to produce periodic, time-varying signals that represent the amplitude of the servo read signal during the successive time windows. Additional processing circuity responds to the servo read signals to produce a servo error signal defining a magnitude and direction of any off-track error between the actual and the desired position of the read/write head. The servo error signal is used to drive a disk drive's head positioning actuator assembly which causes the head to move radially over the disk surface to thereby fly over the centerline of the desired track.

In the simplest case, commonly referred to as an "A-B" servo pattern, when the head flies exactly over the track centerline, a sequential reading of the oscillating, periodic "A" and "B" servo burst fields causes the servo system to produce a null servo error signal if the read/write head is ideally positioned over a track. The "A" servo burst read signal should have each of its positive and negative going oscillating peaks giving precisely the same magnitude value. With all such peaks having the same value, the "A" servo burst read signal would thereby define a uniform "burst amplitude". Follow-on signal processing circuitry is then able to properly demodulate the "A" servo burst read signal in order to produce a demodulated analog signal having a value corresponding to the uniform amplitude of the "A" burst. Likewise, the "B" servo burst read signal would have each of its peak values giving the same, consistent magnitude during the timing window in which the "B" burst is read. Follow-on signal processing circuitry would then properly demodulate the "B" burst in order to produce an analog signal having a value corresponding to the "B" burst's uniform amplitude. Under ideal circumstances, involving two demodulated signals having the same value, the difference between them, as represented by the servo error signal, would be null.

If the active read/write head is not precisely over the centerline of a particular track, the sequential reading of a servo "A-B" burst pattern will cause follow-on servo demodulation and processing circuitry to produce a servo error signal, indicating both the magnitude and direction of the read/write head's position error from the desired track centerline. For example, if a read/write head is positioned more towards the "B" burst portion of the track, the "B" burst will be read as having a higher amplitude than the "A" burst and, when the two bursts are demodulated and processed, the difference in amplitudes will indicate the degree by which the read/write head is off the track centerline, while the sign of the difference indicates the direction that the head is displaced relative to the track centerline. By comparing the values of the "A" and "B" demodulated signals, servo processing circuity can determine the transducer head position relative to the desired data track centerline.

Thus, it may be seen that the accuracy of a head positioning servo system depends greatly upon the accuracy of the servo error signal which, in turn, depends greatly upon the accuracy of the servo burst read signal processing circuity. As part of the process, an alternating polarity servo read signal, representing a servo burst, must first be amplified in order to define a signal suitable for processing by follow-on circuitry, and rectified in order to allow efficient processing by modern CMOS analog ADC/DAC circuitry. Once the signal is amplified and rectified, a demodulated analog signal, representing the burst amplitude is produced by determining the average value of the magnitudes of the peaks, i.e., a peak averaging approach, or by determining the area defined under each individual peak and taking the average of the areas or a normalized sum of all of the areas in order to represent the burst signal's amplitude, an approach termed area integration.

Referring now to FIGS. 1 and 2, there is depicted a generalized block diagram of a servo channel gain configuration according to the prior art and a generalized waveform diagram depicting a portion of an exemplary processed alternating polarity signal representing a servo burst at various stages of the amplification and rectification process. As shown in FIGS. 1 and 2, an in-coming representative servo read signal is an oscillatory, periodic, alternating polarity waveform which characteristically exhibits both positive-going and negative-going peak excursions. Conventionally, preamplifier circuitry comprising a typical read/write transducer head defines a read signal, whether servo or data, as a differential signal, with each signal having a 180 degree phase relationship with the other. One of the differential signals is conventionally termed $V_{in+}$, or "positive"; the other, 180 degrees out-of-phase, is conventionally termed $V_{in-}$, or "negative", such that positive excursions on the $V_{in+}$ differential signal are mapped over negative excursions on the $V_{in-}$ differential signal. In FIG. 1, the positive and negative differential voltage signals are provided to a gain stage 10 at respective inputs 12 and 14. One of these differential signals, the positive or $V_{in+}$ signal, is depicted in the exemplary timing and waveform diagram of FIG. 2. Since the positive and negative differential signals are identical except for their phase relationship, any description pertinent to the "positive" differential signal is equally applicable to the "negative" signal.

Differential input voltage signals are first amplified by a transconductance amplifier 16, by which the alternating polarity differential voltage signals are amplified and converted into alternating polarity differential current signals. As is customary practice in the art, the amplification factor of a transconductance amplifier is given as "gm", and is defined as the small signal gain developed through the device. As was described in the case of the input voltage, the current output of the transconductance amplifier 16 defines a double ended, differential signal comprising a "positive" current signal, denoted i+, and a "negative" current signal, denoted i-, having the same 180 degree phase relationship as the differential input signals. When evaluated against a zero reference, the amplified "positive" current waveform, output by the transconductance amplifier 16, would be as represented by the curve designated i+ in the exemplary waveform diagram of FIG. 2.

Following transconductance amplification, the differential, alternating polarity current signals are further amplified by a transimpedance amplifier 18, wherein the differential currents are now converted to amplified, differential voltages, denoted $V_{o+}$ and $V_{o-}$. Again, in FIG. 2, only the "positive" voltage signal $V_{o+}$ is depicted. The alternating polarity, differential output voltage signals developed by the transimpedance amplifier 18, are next full-wave rectified by a voltage rectifier 20 to thereby develop a single ended, typically negative polarity, rectified voltage signal $V_R$, as indicated in the exemplary waveform diagram of FIG. 2. The rectified output voltage $V_R$ is now single-ended with all negative-going peaks and exhibits an oscillation frequency twice that of the original alternating polarity differential input voltage signals $V_{in+}$ or $V_{in-}$.

As is well known in the art, the signal amplification associated with the gain stage 10 is defined as the product of the amplification provided by each of the amplifier stages; the transconductance amplifier 16 (with gain expressed as gm), and the transimpedance amplifier 18 (with gain expressed as R). Thus, the relationship between the positive-going peak developed through the transimpedance amplifier 18 ($V_{o+}$) and the corresponding positive-going peak of the input voltage waveform ($V_{in+}$) can be expressed as $V_{o+}/V_{in+}=(gm \times R)$, or $V_{o+}=(gm \times R)V_{in+}$.

A zero crossing detector (ZCD) 22 is configured, in the illustrated embodiment of FIG. 1, as a conventional switch with its inputs coupled to both of the alternating polarity differential voltage inputs 12 and 14 of the gain stage 10. The zero crossing detector 22 functions to provide a digital logical output signal (essentially a clock signal) whose transition edges define a timing interval having a periodicity exactly equal to the periodicity of the alternating polarity input voltage signal. ZCD 22 functions to mark in time those points at which the input voltage crosses the zero reference in both the negative-going and positive-going directions. The ZCD output signal provides a timing reference to the voltage rectifier 20 in order to align the resultant rectified waveform peaks.

However, this prior art-type approach to gain stage amplification and rectification is subject to both peak magnitude modulation caused by non-random noise and random error sources, and peak displacement caused by an inherent lack of symmetry in the positive and negative amplification portions of the amplifiers as well as non-symmetrical behavior in the ZCD 22 in connection with the timing edges associated to the negative-going and positive-going zero crossings. These inherent non-symmetrical response characteristics of the gain stage and ZCD cause the $V_R$ peaks to be displaced, in time, from their desired positions so as to exhibit an uncharacteristically high or low magnitude value when evaluated inside a timing window in, for example, an area integrator circuit. As depicted in general form in the timing and waveform diagram of FIG. 2, peak displacement of the amplified and rectified output signal $V_R$ can result in area cut-off of the leading or trailing edges of the waveform or can result in significant dead areas between peaks, both resulting in errors in the integrated area calculation. Minimization of these timing errors usually requires use of costly, high precision components in both the gain stage and ZCD circuits, as well as in the Integrator circuitry, leading to a significantly higher cost for a servo system demodulator circuit.

SUMMARY OF THE INVENTION

The present invention is directed to improved signal processing circuitry for an embedded-type head positioning servo system in which spaced-apart servo bursts move beneath an active read/write transducer head to produce servo burst signals used to provide positional feedback information in a disk drive servo loop.

The signal processing circuit includes a servo system demodulator for converting servo burst signals representing read/write transducer head position information into digital signals appropriate for further processing by a servo or disk drive controller circuit. The demodulator includes a high speed gain stage which converts differential input voltage signals into amplified, full-wave rectified output voltage signals suitable for integration by an integrator circuit and subsequent storage in a multiplicity of sample and hold circuits.

A transconductance amplifier is configured to receive differential voltage signals representing servo bursts and convert the differential voltage signals into corresponding differential current signals. Differential current signals are provided to a full-wave current rectifier circuit which defines a rectified current signal which is, in turn, directed to a transimpedance amplifier. The transimpedance amplifier converts the rectified current signal into a rectified voltage signal. A DC offset cancellation circuit is coupled to the input of the transimpedance amplifier in parallel-fashion with the current rectifier. The DC offset cancellation circuit mirrors any DC leakage circuits developed in the current rectifier and subtracts the leakage current from the conduction path between the current rectifier and the transimpedance amplifier so as to minimize DC offsets developed.

In one aspect of the invention, the DC offset cancellation circuit includes a dummy rectification circuit constructed as a mirror image of the full-wave current rectifier. The dummy circuit is coupled to the full-wave rectifier by an operational amplifier configured as a voltage follower such that any DC currents developed in the full-wave rectifier are mirrored in the dummy circuit. A dummy transimpedance amplifier block is constructed with a voltage follower-connected operational amplifier and transistor combination which controls a current sink transistor connected to the active input of the transimpedance amplifier in operative response to the DC leakage current mirrored in the dummy circuit. The current sink transistor is adaptively controlled to conduct the DC leakage currents developed in the rectifier away from the transimpedance amplifier input such that only rectified current signals are amplified and converted to rectified voltage signals.

In an additional aspect of the present invention, the transconductance amplifier is constructed with first and second active voltage-to-current conversion paths, with each path constructed as a mirror image of the other. Each path includes a voltage-follower configured operational amplifier and transistor combination with each operational amplifier connected to receive a respective one of the differential voltage signals at an input. Each of the voltage-follower transistors define a respective differential current output at the respective drain terminals. The full-wave current rectifier is constructed with first and second forward conduction paths, with each path constructed as a mirror image of the other. Each path is configured to allow current flow in only a single direction, with each path connected to a respective one of the differential current outputs of the transconductance amplifier. The first and second forward conduction paths are combined together at the output to define a full-wave rectified current.

In yet another aspect of the present invention, the full-wave current rectifier includes first and second reverse conduction paths, each path constructed as a mirror image of the other and each path configured to allow current flow in a single direction opposite the direction of the forward conduction paths. The first and second reverse conduction paths are coupled together at an output to define a full-wave rectified current having a polarity opposite the polarity of the full-wave rectified current defined by the forward conduction paths.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE INVENTION

A high speed gain stage with DC offset cancellation, in accordance with practice of the present invention is most suitable for use in connection with closed-loop servo motion control systems such as are found in rotating magnetic hard disk drives. Conventionally, magnetic hard disk drives include two or more data recording disks which rotate about a common axis of revolution. Each disk might be coated with magnetic recording media in which digital information such as user data and servo burst fields are recorded as magnetic flux reversals. Information is read from or written to the disks by read/write transducer heads which "fly" above the surface of a disk in proximity with a disk so as to either cause or detect magnetic flux reversals. The read/write transducer heads are driven by an actuator motor which positions the heads to selected radial positions relative to the surface of the disk.

Typically, the signal pick-up and processing circuitry used in a rotating hard disk drive is termed the channel electronics and suitably includes a preamplifier circuit connected to the read/write transducer heads for controlling the writing of data to the magnetic media on the disks and the reading of user data and servo information from the magnetic media. When reading data or servo information, the preamplifier receives alternating polarity analog signals induced in the read/write transducer head by means of the head passing over magnetic flux reversals recorded on the rotating magnetic disk. These alternating polarity analog signals are preamplified and conventionally provided as alternating polarity, differential signals to follow-on read channel circuitry such as an AGC/Filter and Pulse Detector circuit, as is common practice in the art.

Although read channel electronics typically comprise an AGC, Filter, and Pulse Detector stage, servo burst data is only processed by the AGC and Filter stages prior to being directed to a servo demodulator circuit. Since servo burst data is taken from the read channel prior to pulse detection, servo data is provided to the servo demodulator circuit in analog form.

Figure 1:
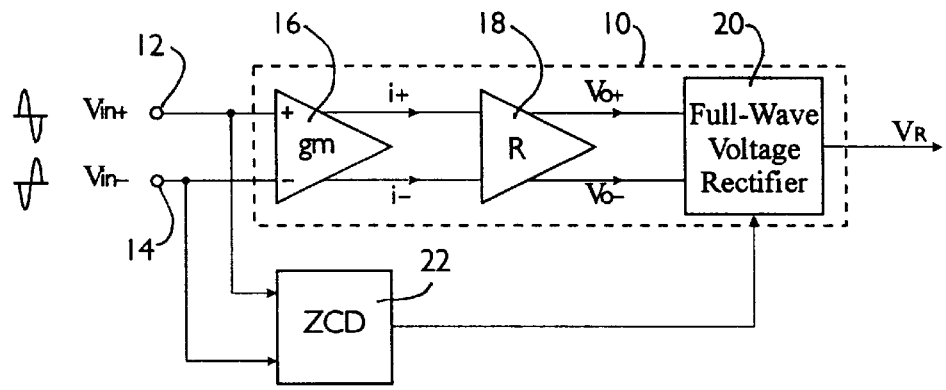
FIG. 1 is an exemplary simplified semi-schematic block diagram of a representative servo system gain stage according to the prior art.
Figure 2:
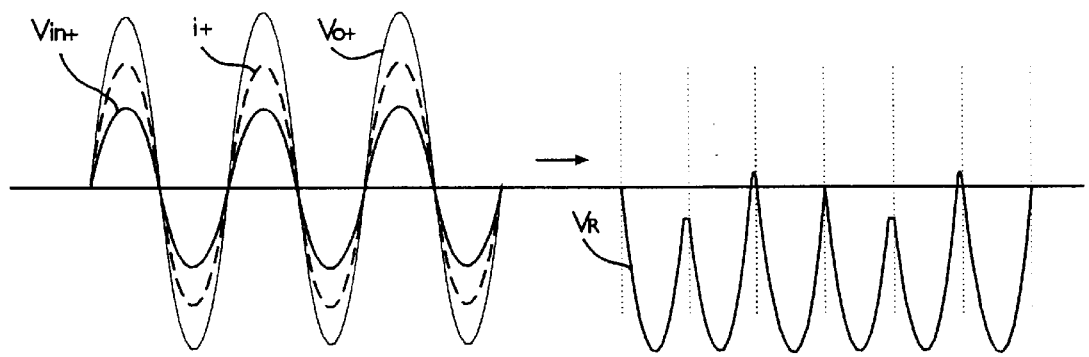
FIG. 2 is an exemplary timing and waveform diagram illustrating the amplification and rectification characteristics of the prior art gain stage of FIG. 1.
Figure 4:
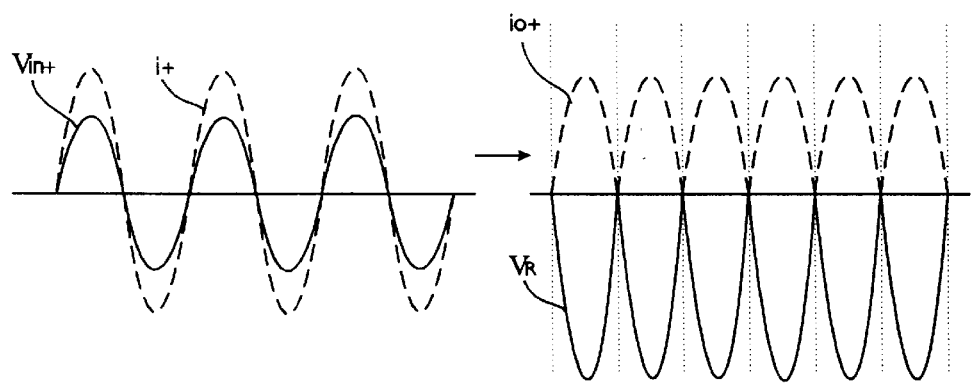
FIG. 4 is an exemplary timing and waveform diagram illustrating the amplification and rectification characteristics of the novel gain stage of FIG. 3.

Turning now to FIG. 1, alternating polarity, differential voltage signals representing "positive" and "negative" portions of a differential servo burst signal are provided to the positive and negative inputs, denoted $V_{in+}$ and $V_{in-}$, respectively, of a high speed gain and rectification circuit 26, constructed in accordance with the present invention, and whose amplification and rectification characteristics are depicted in the exemplary timing and waveform diagram of FIG. 4. Briefly, the alternating polarity differential servo burst information is defined as a double-ended signal in which the "positive" signal, identified as $V_{in+}$, is directed to a "positive" input of a transconductance amplifier 28. The amplifier's "negative" input is connected to receive the "negative" signal of the differential servo burst signal, denoted $V_{in-}$. As shown in the exemplary timing and waveform diagram of FIG. 4, the transconductance amplifier 28 functions to receive a double-ended voltage signal and output a double-ended, alternating polarity, amplified current signal. As discussed in connection with FIG. 2, above, only the "positive" signals are depicted in the timing and waveform diagram of FIG. 4 for clarity and ease of description. The greater magnitude of the current peaks depicted in the exemplary timing and waveform diagram of FIG. 4, as opposed to the magnitude of the input voltage peaks is a function of the amplification factor of the transconductance amplifier 28, which is conventionally given as "gm".

Following current amplification through transconductance amplifier 28, the differential, alternating polarity current signals are directed to a current rectifier circuit 30, where the negative-going current peaks are "flipped" so as to define a positive polarity signal (or pulse) train having a frequency precisely twice that of either of the initial differential alternating polarity signal, as shown in the exemplary timing and waveform diagram of FIG. 4. In a manner to be described in greater detail below, the current rectifier circuit 30 defines an output current pulse train io in a manner such that the pulse train exhibits little or no peak displacement typically associated with the non-symmetrical behavior of prior art-type rectification circuits. Moreover, the current rectifier circuit 30 defines the peak or pulse train "io" without reference to a timing interval defined by the transition edges of a zero crossing detector output signal. Accordingly, and as can be seen in the waveform diagram of FIG. 4, the rectified current signal "io" exhibits a uniform periodicity such that each of its component peaks falls within an appropriate timing window such as might be required by an integrator circuit.

Current-to-voltage conversion and final amplification is performed in a transimpedance amplifier 32 in which the rectified current waveform "io" is further amplified and converted to an amplified, negative polarity output voltage signal $V_R$ as indicated in the exemplary waveform diagram of FIG. 4. Transimpedance amplifier 32 provides an amplification factor, conventionally denoted as R, to the rectified current waveform such that the final single polarity output voltage $V_R$ has a suitable magnitude for processing by an integrator circuit 34. It should be noted, herein, that the physical implementation of the integrator circuit 34 has no direct bearing on the construction or operation of the high speed gain stage with DC offset cancellation according to the present invention. The integrator circuit 34 might be configured as either a peak integrator or an area integrator, although an area integrator is preferable. In the illustrated embodiment of FIG. 3, the rectified voltage signal $V_R$ is directed to the negative or inverting input of the integrator circuit 34. The integrator's positive or non-inverting input is coupled to a 0.75 volt reference signal, termed SERVO REF, which functions to define a reference voltage level against which the amplified and rectified servo burst ($V_R$) is evaluated. Those having skill in the art will immediately understand that the polarity of the rectified voltage will determine the polarity of the integrator input to which it is applied. The polarity of the rectified voltage signal is merely a matter of design choice, and is a function of the construction and operation of follow-on circuitry, such as an ADC/DAC. It will be understood, therefore, that signal polarity, per se, is not pertinent to the present invention, and that positive polarity signals may be substituted for negative polarity signals without violating the scope and spirit of the invention.

Figure 3:
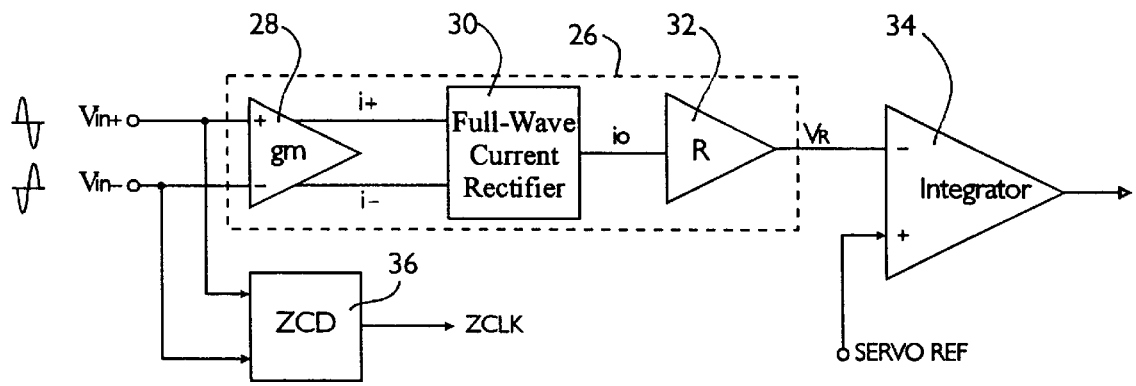
FIG. 3 is an exemplary semi-schematic block diagram of a servo system gain stage including an integrator circuit according to practice of principles of the invention.

A zero crossing detector (ZCD) 36 is configured, in the illustrated embodiment of FIG. 3, as a differential comparator having its non-inverting input connected to the "positive" differential input voltage signal $V_{in+}$ and having the "negative" differential input signal $V_{in-}$ applied to its inverting input. Zero crossing detector 36 functions to define a digital output signal having transitions defined at the point where the alternating polarity input signal crosses a zero reference in the positive-going direction and where the alternating polarity input signal crosses the zero reference in the negative-going direction. The zero crossing detector 36 can be viewed as providing a clock signal whose transition edges define a timing interval having a periodicity exactly equal to the periodicity of the alternating polarity input signal. In a manner to be described in greater detail below, the zero crossing detector output signal, denoted as ZCLK, is used in connection with a servo demodulator digital control circuit in order to define control signals which establish the timing windows of the integrator circuit 34 and which assert a FLUSH control signal that clears the integrator 34 of any residual charge residing on its internal capacitors and makes the integrator 34 ready to receive the next amplified and rectified servo burst information.

Figure 5:
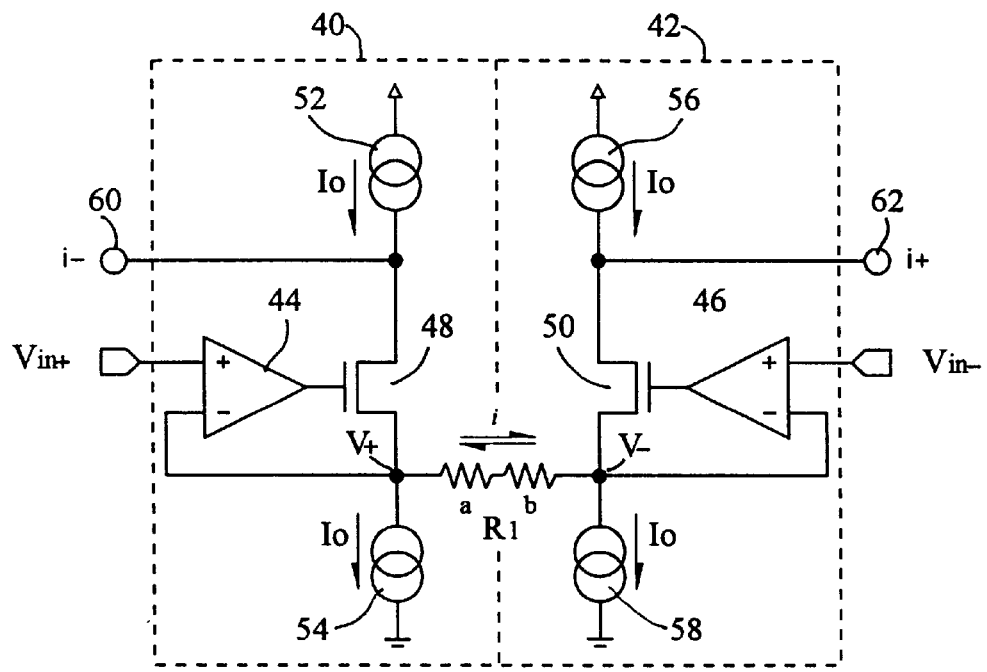
FIG. 5 is an exemplary semi-schematic circuit diagram of a transconductance amplifier in accordance with the present invention.

Peak displacement is minimized, in accordance with practice of principles of the invention, by constructing each of the components, i.e., the transconductance amplifier 28 and current rectifier 30, that operate on alternating polarity signals, with mirror image signal paths, one path for each of the "positive" and "negative" differential signals, such that symmetry in each path is maintained. In particular, FIG. 5 depicts an exemplary semi-schematic circuit diagram of the transconductance amplifier 28, in which each circuit leg is a mirror image of, and symmetrical with, the other. The circuit elements for processing the "positive" differential voltage signal is indicated at 40, while the circuit elements for processing the "negative" differential voltage signal is indicated at 42. Positive and negative voltage signals, $V_{in+}$ and $V_{in-}$, respectively, are directed to the positive or non-inverting inputs of corresponding differential amplifiers 44 and 46. Differential amplifier 44 on the positive circuit side 40 is configured as a voltage follower with its output driving the gate terminal of an n-channel transistor 48 and whose negative or inverting input is connected to the NFET's source terminal at a voltage node denoted in FIG. 5 as $V_+$. Likewise, the differential amplifier 46 on the negative side 42 is also configured as a source follower with its output driving the gate terminal of a corresponding n-channel transistor 50 and whose negative or inverting input is connected to the NFETs source terminal to thereby define a voltage node denoted in FIG. 5 as $V_-$. In operation, each of the differential amplifiers 44 and 46 function in cooperation with their respective n-channel transistors 48 and 50 to define a voltage at their respective voltage nodes $V_+$ and $V_-$ that is equal to the input voltage defined at their positive inputs and noted as $V_{in+}$ and $V_{in-}$, respectively.

In order to develop these voltages, upper and lower current sources are provided in each of the mirror-image paths. On the positive side 40, an upper current source 52 is coupled between a supply voltage and the drain terminal of the n-channel transistor 48, while a lower current source 54 is coupled between the voltage node $V_+$ (i.e. the NFET's source terminal) and ground potential. Similarly, on the negative side 42, an upper current source 56 is coupled between a power supply and the drain terminal of n-channel transistor 50 and a lower current source 58 is coupled between the NFETs source terminal (voltage node $V_-$) and ground potential. Each of the upper current sources 52 and 56 are conventionally constructed of p-channel transistors in a fashion which is common practice in the art and each function to define a current $I_0$ which is sourced down the respective mirror-image legs of the transconductance amplifier circuit. The lower current sources 54 and 58 are similarly constructed of n-channel transistors in a manner which is common practice in the art and each operates to sink a current $I_0$ defined to have the same magnitude as the current $I_0$ sourced by the upper current sources 52 and 56, respectively.

A resistor $R_1$, depicted in the illustrated embodiment of FIG. 5 as having two separate resistive elements, $R_{1a}$ and $R_{1b}$, is connected to span the voltage nodes $V_+$ and $V_-$ defined at the source terminals of the NFETs. Although the resistor is illustrated as comprising two component parts, this is done primarily to illustrate the mirror-image construction of the circuit of FIG. 5 rather than to imply that two separate resistive elements are necessary to effect a resistor between the voltage nodes. When implementing the circuit using a contemporary CMOS integrated circuit manufacturing process, it is preferable to implement the resistor spanning the voltage nodes as two separate elements, in order to ensure absolute symmetry between the circuit halves, but if silicon area becomes an issue, implementing the resistor as a single element will not greatly disturb the advantages of the present invention.

Amplified, differential current output signals are taken from the transconductance amplifier circuit of FIG. 5 at "positive" and "negative" differential current outputs 62 and 60, respectively. The positive differential current is denoted in FIG. 5 as i+, while negative differential current is denoted in the exemplary circuit as i−. As will be developed in greater detail below, the amplification and transform expression for the output current is defined by the values of the input voltage, $V_{in+}$ and $V_{in-}$, as expressed by the voltage nodes $V_+$ and $V_-$, and the value of the resistor $(R_{1a}+R_{1b}=R_1)$ spanning the voltage nodes in accordance with the following equation: $i=(V_+-V_-)/R_1$=differential current.

In operation, the transconductance amplifier illustrated in FIG. 5 provides differential alternating polarity current outputs 180° out-of-phase with one another in response to differential alternating polarity input voltages $V_{in+}$ and $V_{in-}$. The phase relationship between the alternating polarity current outputs i+ and i− is defined by a current i developed across the resistor element $R_1$ which spans the voltage nodes $V_+$ and $V_-$. Specifically, taking the case of a rising $V_{in+}$ and a falling $V_{in-}$, it will be clear that the differential amplifier 44 in cooperation with its corresponding n-channel transistor 48 functions to control the voltage value on voltage node $V_+$ such that it follows the voltage value $V_{in+}$ received on the comparator's positive input. Likewise, differential amplifier 46 and its corresponding n-channel transistor 50 function to control the voltage value on voltage node $V_-$ such that it follows the value of $V_{in-}$ provided on that amplifier's positive input. Accordingly, the differential between the input voltages $V_{in+}$ and $V_{in-}$ is reflected on the voltage nodes $V_+$ and $V_-$. This differential voltage causes current to flow through the resistor element $R_1$ in the direction from the higher potential to the lower potential. Since both $V_{in+}$ and $V_{in-}$ are alternating polarity signals, it will be understood that the current developed across the resistor element $R_1$ likewise alternates direction in conformance with the differential voltage impressed across the resistor element.

Figure 6:
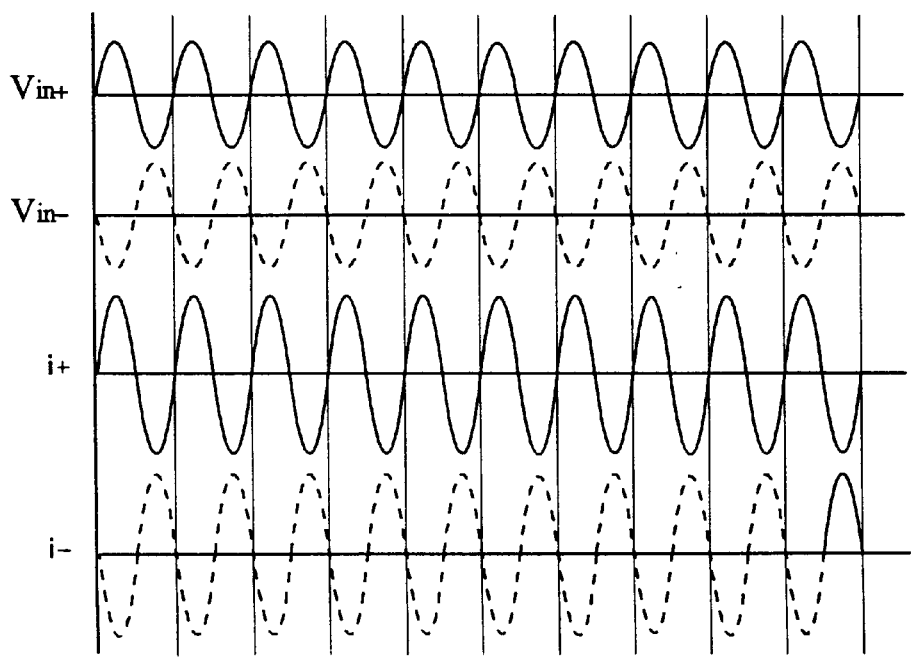
FIG. 6 is an exemplary timing and waveform diagram depicting the amplification characteristics of the transconductance amplifier of FIG. 5.

It should also be noted that the nominal current flowing through each conduction leg of the transconductance amplifier is defined by the upper and lower current sources, with the nominal current $I_o$ sourced by upper source 52 being sunk by lower current source 54. On the other side, upper current source 56 sources a nominal current $I_o$ which is, in turn, sunk by lower current source 58. The additional alternating polarity, time varying current developed across resistor element $R_1$ is, therefore, sourced and sunk through the current output terminals 60 and 62. In the case where $V_{in+}$ is at its maximum positive value and $V_{in-}$ is at its maximum negative value, a maximum differential voltage is developed across resistor element $R_1$ which generates a differential current i from the $V_+$ node to the $V_-$ node. Since the lower current source 58 is configured to only sink a current having a value $I_o$ and since $I_o$ is being sourced by upper current source 56, the additional differential current i represents a current component which must necessarily flow out of the device at output 62. Likewise, since the differential current i is flowing out of the right hand portion of the circuit, it will be understood that a corresponding current must be flowing into the opposite conduction leg through current input 60. The alternating polarity and time varying nature of the current flow into and out of the transconductance amplifier at the output 60 and 62 is indicated in the exemplary waveform diagram of FIG. 6, where the solid waveform trace represents the current i+ at the current output 62 and the dashed waveform trace represents the current i− at current output 60, with both being plotted as a function of time. It should be noted that the inherent symmetry of the transconductance amplifier illustrated in FIG. 5, ensures that an accurate 180° phase relationship is maintained between i+ and i− such that zero crossings are mapped directly over one another and maximum peak excursions are mapped directly over minimum peak excursions for opposite waveform traces.

Figure 7:
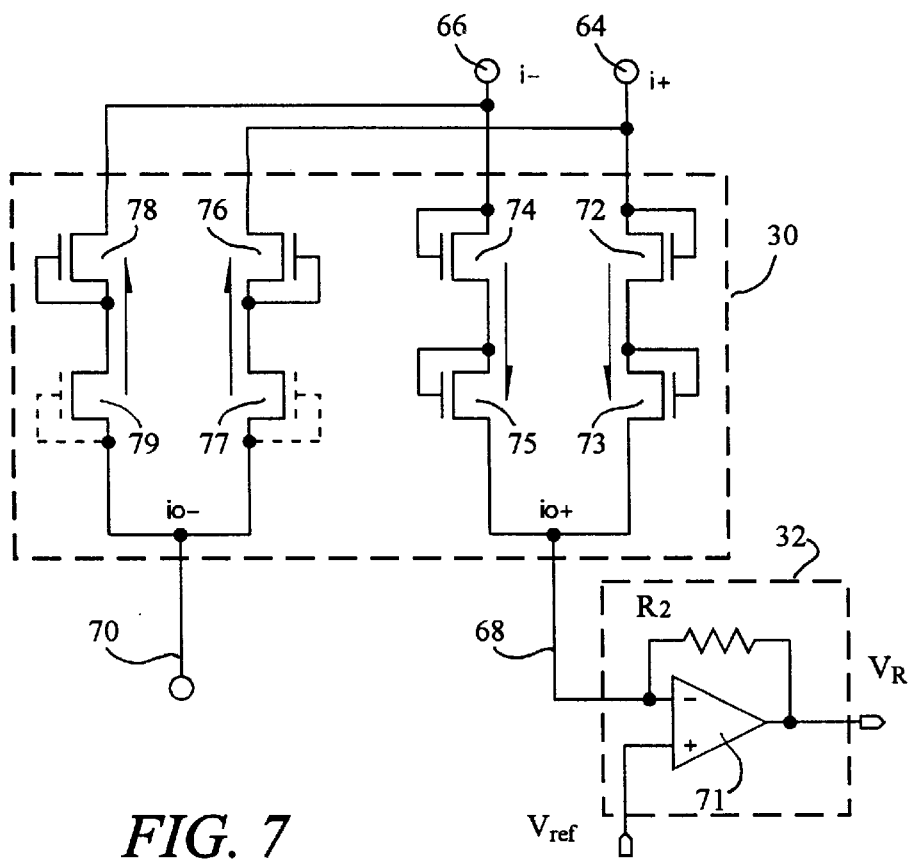
FIG. 7 is an exemplary semi-schematic circuit diagram of a current rectification and transimpedance amplification circuit of the novel gain stage of FIG. 3.
Figure 8:
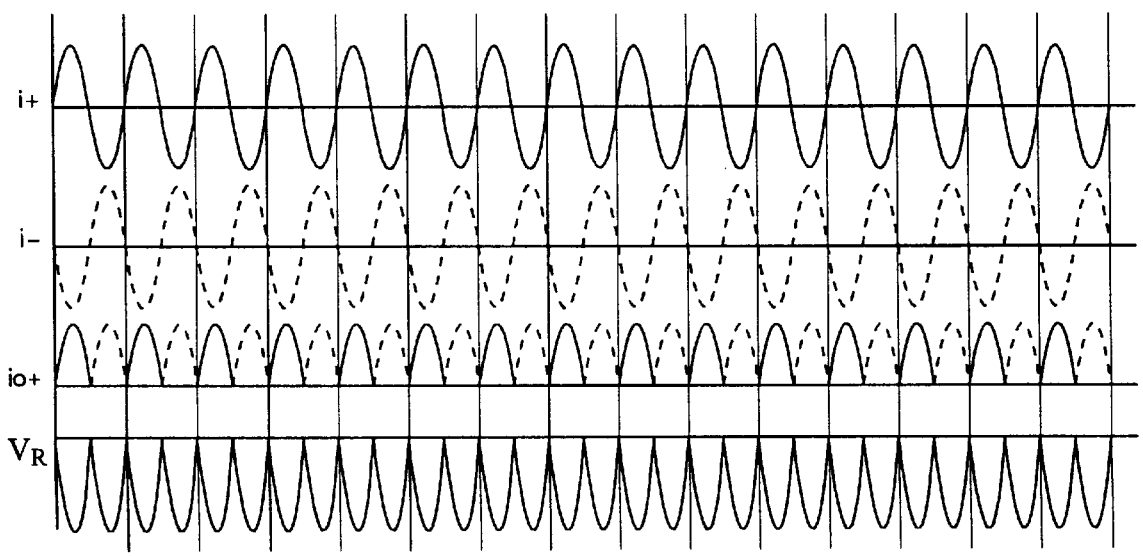
FIG. 8 is an exemplary timing and waveform diagram depicting the amplification characteristics of the current rectification and transimpedance amplification circuit of FIG. 7.

Turning now to FIG. 7, there is depicted a semi-schematic circuit diagram of a current rectifier circuit 30 in accordance with the present invention coupled to a transimpedance amplifier 32. The current rectifier 30 and transimpedance amplifier 32, in combination, function to receive the alternating polarity, differential current signals i+ and i− developed by the transconductance amplifier, and develop therefrom a voltage output signal $V_R$ representing an amplified and rectified servo burst signal. The alternating polarity differential current signals from the transconductance amplifier are directed to positive and negative inputs 64 and 66, respectively, of the current rectifier circuit 30. As was the case with the transconductance amplifier of FIG. 5, the current rectifier circuit 30 is constructed with two mirror-image paths, one path for the "positive" current signal i+ and one path for the "negative" current signal i−. Each of the conduction paths are constructed with identical components, both active and passive, such that each current signal of a first polarity and phase will experience precisely the same circuit delays and parasitic capacitances as a current signal of the opposite polarity and phase. This being the case, the current rectifier 30 is constructed with two outputs, a "positive" rectified current output 68 and a "negative" rectified current output 70. As will be developed in greater detail below, only one of the outputs is required for proper functioning of the gain stage, but having a second output is desirable not only for reasons of symmetry but also in order to provide a second, parallel signal which is available for comparison purposes or for any other desired follow-on applications. Although the second output 70 is able to provide a source of a parallel rectified signal, it is preferably coupled to a dummy load in order to maintain the symmetry characteristics of the circuit.

As can be seen from FIG. 7, the signal path from the positive input 64 to the positive output 68 is defined by a pair of series-connected n-channel transistors 72 and 73, each configured as a forward gate between the input 64 and the output 68. The transistors 72 and 73 are termed forward-gate configured because their gate terminals are each feed-back connected to their drain terminals such that each transistor's $V_{DS}$ is equal to $V_{GS}$. Similarly, the signal path from the negative input 66 to the positive output 68 is also defined by a pair of series-connected n-channel transistors 74 and 75 which are also forward configured such that each transistor has a $V_{DS}$ equal to $V_{GS}$. It will be understood by those having skill in the art, that each of the series-connected n-channel transistor pairs will only allow current conduction in the forward direction, i.e., from either input to the positive output 68. It will be evident that only the positive portions of either the "positive" or "negative" differential current signals will be allowed to pass to the positive output 68.

An additional conduction portion, a reverse conduction portion, is also connected to the positive and negative inputs 64 and 66 in order to accommodate the negative-going portions of the "positive" and "negative" differential current signals. As can be seen from FIG. 7, the signal path from the positive input 64 to the negative output 70 is defined by a pair of seriesconnected reverse (diode) configured n-channel transistors 76 and 77. Likewise, the signal path from the negative input 66 to the negative output 70 is also defined by a pair of series-connected reverse (diode) configured n-channel transistors 78 and 79. The n-channel transistors are referred to as reverse configured in the sense that their gate terminals are feed-back connected to their source terminals as opposed to the forward configured case where the transistor's gate terminals are feed-back connected to their drain terminals. Accordingly, it will be understood that the reverse circuit will only allow current flow from the negative output 70 to the positive and negative inputs 64 and 66. Accordingly, it will be understood that as the positive output 68 is able to define a single polarity signal which is positive-going, the negative output 70 is able to define a single polarity signal which is negative-going.

Pertinent to the description of the reverse circuit portion of the current rectifier 30, is the realization that the reverse diode configured transistor pairs 76/77 and 78/79 need not be provided as series-connected pairs. Indeed, in the illustrated embodiment of FIG. 7, the distal transistors of each pair, 77 and 79 respectively, are depicted with gates and gate terminals drawn in phantom, indicating that these transistors are optionally disposed in the current path. Whether each of the conduction legs of the reverse circuit is comprised of a single transistor, a series-connected pair, or a multiplicity of series-connected elements, is a matter of design choice and depends only on the magnitude of the voltage drops contemplated for each of the conduction legs. In the circuit illustrated in FIG. 7, with the optional transistors 77 and 79 omitted from the reverse circuit, it will be seen that approximately 2.1 Volts of drop are developed as each leg of the circuit is fully traversed.

For example, beginning at the reverse circuit output 70, and traversing the "positive" leg, approximately 0.7 Volts are dropped across the reverse transistor 76, following which, approximately 1.4 Volts are dropped across the series-connected forward pair 72 and 73 (approximately 0.7 Volts each), such that the circuit traversal results in an approximate 2.1 Volt drop from the "negative" output 70 to the "positive" output 68. Adding or subtracting transistors in the forward or reverse legs will appropriately increase or decrease the magnitude of the voltage drop across that leg; the absolute value of which is a function of the requirements of follow-on circuitry, such as an ADC/DAC, and is therefore solely a matter of design choice. All that is required is that the transistors in the "positive" circuit leg be equal in number and aspect ratio to the transistors in the "negative" leg.

In operation, the current rectifier 30 functions to combine the positive-going portions of the differential current waveforms i+ and i− into a positive, rectified current output signal "io+" at the positive output 68. In addition, the current rectifier 30 functions to combine the negative-going portions of the alternating polarity current signals i+ and i− into a rectified negative-going signal "io−" at the negative output 70. It can be seen from FIG. 7 that. as the "positive" current signal i+ rises above zero (i+>0), the current value at the positive output 68 io+ will equal i+. As the value of the "positive" current waveform drops below zero, the n-channel transistor 72 and 73 turn off. As i+ falls below zero, i− necessarily rises above zero due to the inherent symmetry of the transconductance amplifier as described above. As i− rises above zero (i−>0), the n-channel transistors 74 and 75 turn on and the current value at the positive output 68 io+ is equal to i−. Thus, at the desired positive output 68, the rectified output current signal can be described as follows:

i+>0: io+=i+ i+<0: io+=i−

The same analysis may be performed with respect to the negative output 70 of the current rectifier circuit 30 with generally similar results, except that the output current waveform is a negative-going single polarity signal from the zero reference. Thus, it can be seen that the current rectifier circuit 30 provides two equal, but opposite, output current waveforms due to the inherent symmetrical nature of the rectifier's construction. As was the case with the transconductance amplifier of FIG. 5, the current rectifier circuit of FIG. 7 ensures that the phase relationship established between the alternating polarity differential current signals is not disturbed during the rectification process.

Rectified, positive polarity current signals io+ are directed from the positive output 68 of the current rectification circuit 30 to the transimpedance amplifier 32. The rectified current signal is provided to the inverting input of an operational amplifier 71, whose non-inverting input is coupled to a 0.75 volt reference voltage. The amplifier 71 is configured as an inverting amplifier with a gain developed by a gain-setting resistor element $R_2$ connected between the inverting input and the output in conventional fashion. The transimpedance amplifier 32 defines a voltage output $V_R$ which represents an amplified, rectified servo burst signal suitable for further processing by, for example, an area integrator. It will be understood by those having skill in the art that the amplification factor of the transimpedance amplifier 32 will be equal to the value of the resistor element $R_2$ such that the output waveform $V_R$ will be equal to $R_2$ io+.

It will be further evident to those having skill in the art that a gain stage constructed of the transconductance amplifier in accord with FIG. 5 and the current rectifier and transimpedance amplifier according to FIG. 7, will effectively amplify the input signal by a factor of $R_2/R_1$ such that:

$V_R/V_i=R_2/R_1$, where $V_i$ represents voltage excursions of the initially input signal representing a servo burst, $R_1$ is the impedance value of the resistor element comprising the transconductance amplifier of FIG. 5, and $R_2$ is the impedance value of the gain-setting resistor comprising the transimpedance amplifier 32 of FIG. 7.

Although a gain stage constructed of the foregoing elements would be considered suitable for most purposes, it should be recognized that the DC bias (approximately 0.7 volts) developed along the primary current paths of the current rectifier 30 necessarily implies some DC leakage current $I_{DC}$ through the rectification path to the input of the transimpedance amplifier 32. This, of course, raises the possibility of a DC offset to the output waveform through the transimpedance stage. Any DC current is uniformly additive or subtractive to the input value and, thus, causes a DC voltage $V_{DC}$ to uniformly skew the output zero. In high-precision applications, it is highly desirable that any DC offset voltage be less than 5.0 mV such that the amount of DC offset integrated along with the signal is small enough to fall within the servo error budget. In order to minimize the DC offset, the leakage current $I_{DC}$ is reproduced by a dummy circuit and subtracted from the transimpedance amplifier input, such that the only current appearing thereon is the io+ current output from the current rectifier 30.

Figure 9:
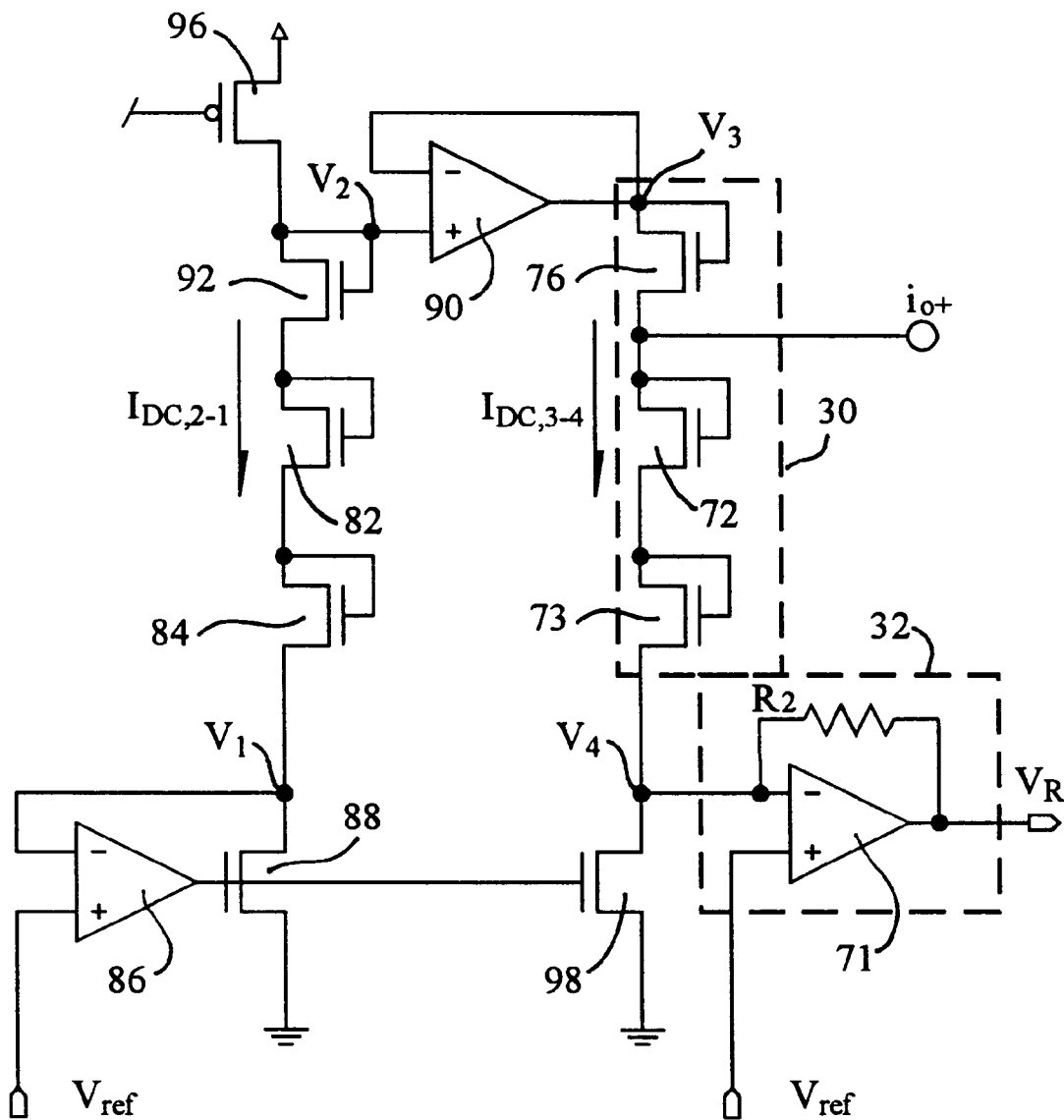
FIG. 9 is an exemplary semi-schematic circuit diagram of the current rectification and transimpedance amplification circuit of FIG. 6 configured to incorporate a DC offset cancellation circuit in accordance with practice of the invention.

Turning now to FIG. 9; there is illustrated a semi-schematic circuit diagram of a DC offset cancellation circuit, comprising a dummy rectification circuit and transimpedance block operational amplifier, which generates the same leakage current $I_{DC}$ as the current rectifier 30 and which is coupled into the signal path between the current rectifier 30 and the transimpedance amplifier 32 so as to subtract the generated leakage current from the signal path, thereby minimizing any DC offset in the transimpedance amplifier. In FIG. 9, the current rectifier circuit is again identified with numeral 30, however, only one of the signal paths is depicted in FIG. 9 for purposes of clarity. The signal path depicted is the "positive" signal path comprising the n-channel transistor 76 defining the reverse circuit portion, disposed in series with the series-connected n-channel transistors 72 and 73 of the forward portion, as depicted in FIG. 7. The "positive" signal path of the current rectifier 30 is connected to a transimpedance amplifier block denoted with the same numeral 32 as was the case with the transimpedance block of FIG. 7. The current rectifier 30 is coupled to the inverting input of an operational amplifier 71 which, again, develops a rectified voltage output $V_R$ with amplification developed by a resistor element $R_2$ connected between the op-amps inverting input and output.

The illustrated embodiment of FIG. 9 further illustrates a DC offset cancellation circuit which is constructed to define a dummy rectification circuit comprising series-connected n-channel transistors 82 and 84 each of which have their gate terminals feed-back connected to their drain terminals. The DC offset cancellation circuit 80 further includes a dummy transimpedance block comprising an amplifier 86 and an n-channel transistor 88 coupled, in combination, as a voltage follower. The n-channel transistor 88 has its gate terminal connected to the output of the comparator 86 and has its drain terminal connected to the non-inverting input of the amplifier. The source terminal of the n-channel transistor 88 is coupled to ground potential. The inverting input of the amplifier 86 is connected to a reference voltage source and, preferably, is also connected in common with the non-inverting input of the op-amp 71 comprising the transimpedance receiver block. The amplifier 86 and n-channel transistor 88, in combination, function to define a bias voltage, termed herein $V_1$ at the drain node of the n-channel transistor 88, which bias voltage is ideally equal to the reference voltage coupled to the amplifier's inverting input. Preferably, the reference voltage is 0.75 volts and is also applied to the non-inverting input of the op-amp 71 of the transimpedance block.

Surmounting the dummy, series-connected n-channel rectifier stack, the DC offset cancellation circuit suitably comprises a source-follower circuit including an amplifier 90 and a pair of n-channel transistors configured with their gate terminals coupled to their drain terminals such that each transistor's drain-source voltages equals its gate-source voltage. The first such n-channel transistor 92 is configured into the circuit such that its source terminal is connected to the drain and gate of the first n-channel transistor 82 of the dummy rectification stack. This n-channel transistor's gate and drain are tied together and further connected to the non-inverting input of the amplifier 90. The amplifier's inverting input is feed-back connected to its output which is, in turn, connected to the common drain and source terminals of the second n-channel transistor 76.

As shown in FIG. 9, the source terminal of n-channel transistor 76 is connected in series-fashion to the drain and gate terminals of the first n-channel transistor 72 comprising the rectification path of the current rectifier 30. A p-channel current source transistor 96 is disposed in the dummy rectification current path and connected between a power supply potential and the drain node of n-channel transistor 92. The p-channel current source transistor's gate terminal is coupled to a suitable 1.5 volt bias source in order to ensure that the n-channel transistors (92, 82 and 84) comprising the current path are in saturation and that, therefore, $V_{DS}=V_{GS}$. Current flow through the n-channel transistors comprising the dummy rectification path, i.e., transistors 92, 82 and 84, defines a bias voltage, denoted herein $V_2$ at the drain node of n-channel transistor 92 and, thus, at the non-inverting input of comparator 90. In response, amplifier 90 operates to define a bias voltage, denoted herein as $V_3$ at the drain and gate terminals of n-channel transistor 76. It will be evident that the bias voltage $V_3$ Will be maintained by amplifier 90 at the same value as the bias voltage $V_2$ appearing at its non-inverting input.

It should also be noted, herein, that the two n-channel transistors 92 and 76 coupled to the amplifier 90 are each constructed with the same transistor geometries and process parameters, such that their operational parameters will be identical. Accordingly, the drain-source and gate-source voltages of n-channel transistor 76 will be the same as the drain-source and gate-source voltages of n-channel transistor 92. Likewise, the n-channel transistors comprising the dummy rectification circuit, transistors 82 and 84, are constructed with the same transistor geometries and process parameters as the n-channel transistors 72 and 73 comprising the current rectifier 30. It will be evident, therefore, that the voltage at the transimpedance amplifier input, denoted herein as $V_4$, will be equal to the bias voltage $V_1$ applied to the non-inverting input of the comparator 86. It will also be evident that any current flowing through the dummy rectification path from voltage node $V_2$ to voltage node $V_1$, i.e., $I_{DC2-1}$ will be equal to any DC current flowing through the actual rectification path from voltage node $V_3$ to node $V_4$, i.e., $I_{DC3-4}$. Moreover, the DC current flowing through the dummy rectification path also flows through n-channel transistor 88 whose gate is controlled by thp amplifier 86. In addition to controlling the gate of n-channel transistor 88, the amplifier 86 output is further connected to the gate terminal of an n-channel current sink transistor 98 whose drain and source terminals are coupled between the voltage node $V_4$ and ground potential, respectively. Accordingly, it will be understood that n-channel current sink transistor 98 also conducts DC current $I_{DC2-1}$. Since $I_{DC2-1}$ is equal in value to $I_{DC3-4}$, the current mirror n-channel transistor 98 functions to remove the $I_{DC3-4}$ current from voltage node $V_4$ and, therefore, from the input of the op-amp 72 of the transimpedance amplifier. DC leakage currents are thereby extracted from the transimpedance amplifier portion of the circuit such that they are unable to develop a DC offset voltage $V_{DC}$ across the resistor $R_2$. It will therefore be understood that the dummy rectification circuit in combination with the dummy transimpedance block functions to define a DC current equal to the DC current developed by the actual rectification circuit and extract that DC current from the input node of the transimpedance amplifier in order to minimize DC offsets.

Figure 10:
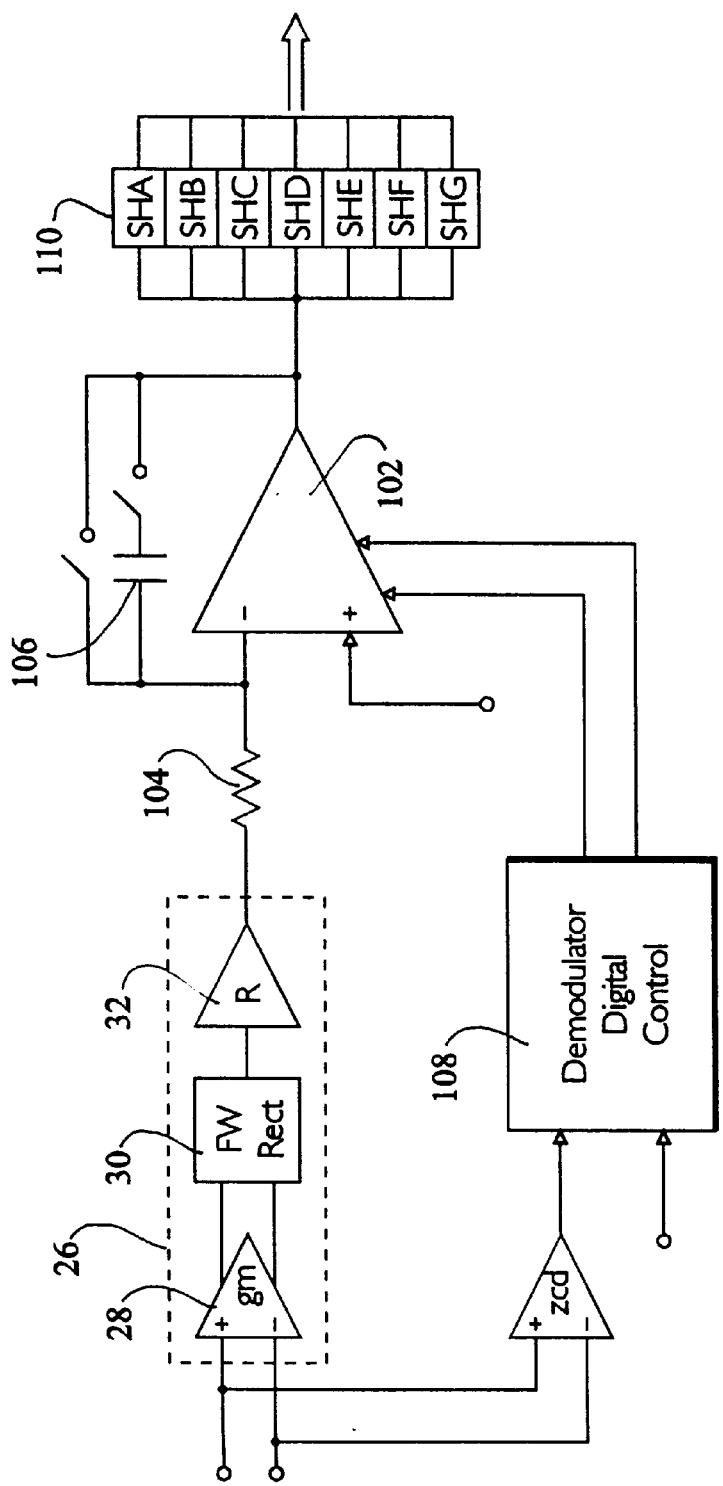
FIG. 10 is an exemplary, semi-schematic block diagram of a servo system demodulator circuit incorporating a high speed gain stage with DC offset cancellation in accordance with the present invention.

Turning now to FIG. 10, there is illustrated, in semi-schematic block diagram form, an exemplary servo system demodulator circuit which incorporates the novel high speed gain stage with DC offset cancellation in accordance with the present invention. In FIG. 10, the gain stage, and its component parts, are identified with the same reference numerals as were used in connection with FIG. 3. Thus, the gain stage 26 suitably comprises a transconductance amplifier 28, a full-wave current rectifier circuit 30 which develops a rectified current signal which is coupled to a transimpedance amplifier 32 whence it is converted into a rectified voltage $V_R$.

Conventionally, the demodulator circuit receives a differential voltage signal representing servo burst information from a disk drive's active read/write transducer head and preamplifier circuit (not shown). An automatic-gain-control circuit (not shown) typically receives the servo burst information and applies a gain to maintain the output level within a predetermined range. Automatic-gain-control circuits (AGC) are well known in the art and typically found on almost all types of disk drive systems. Accordingly, the AGC will not be described further herein.

A differential voltage signal is provided by the AGC circuit to the transconductance amplifier 28 of the novel gain stage 26. Transconductance amplifier amplifies the gain-controlled output of the AGC and provides a differential current signal to a full-wave current rectifier circuit 30 that receives the output of the transconductance amplifier and rectifies it. The high speed gain stage 26 further comprises a transimpedance amplifier 32 that converts the current output of the full-wave rectifier 30 to a voltage.

The servo system demodulator circuit also includes an integrator circuit 100 that integrates the rectified voltage signal provided by the transimpedance amplifier 32 to define an integrated, demodulated servo signal. The integrator circuit 100 suitably comprises an operational amplifier 102 having its inverting input connected to the output of the transimpedance amplifier across a resistor element 104. The resistor element 104 functions to convert the rectified voltage signal developed by the transimpedance amplifier into a current suitable for charging an integration capacitor 106 in a manner well known by those skilled in the art. The integrator circuit 100 further comprises bypass switches which are suitably constructed as rely-type switches, controlled by servo system timing circuitry such as a demodulator digital control circuit 108.

In FIG. 10, the bypass switches are both illustrated in the open position, which functions to configure the integrator 100 into a "charge" condition. In the charge condition, the integrating capacitor 106 integrates the current developed across the resistor 104 within a servo burst peak timing window as defined by control signals developed by the demodulator digital control circuit 108. At the end of a suitable timing window, the current integrated by the capacitor is directed to a selectable one of a multiplicity of sample and hold circuits 110.

Timing windows are defined by a zero-crossing detector (ZCD) 112 which generates timing signals indicative of when the differential input signals reverse polarity (i.e., cross a reference zero in the positive-to-negative going direction, or the negative-to-positive going direction). The ZCD 112 thus marks, in time, the 180 degree phase positions of the input signals, and consequently, the periodicity of the rectified signal.

In conventional fashion, information obtained with regard to the integrated magnitudes of a multiplicity of servo burst signals (A through G in the embodiment illustrated in FIG. 10) are subsequently directed to follow-on processing circuitry, such as an ADC/DAC, for conversion into a digital signal suitable for head position information processing by a servo control circuit or a disk drive control processor.

Although the exemplary high speed gain stage with DC offset cancellation has been described in terms of the illustrated embodiments, persons of skill in the art will readily be capable of constructing a high speed gain stage with DC offset cancellation from a number of different component elements and with a number of different configurations. For example, the embodiments illustrated depict the high speed gain stage as being constructed from MOS transistors. Manufacturing such a circuit from bipolar junction transistors (BJT) is well within the routine skill of an integrated circuit engineer. In addition, as was mentioned above, the actual numbers of the various transistors comprising the various symmetrical current legs of the gain stage's component elements, may be symmetrically increased or decreased depending on the electrical characteristics desired for each stage. Clearly, other embodiments and modifications of the high speed gain stage in accordance with the invention will readily occur to those of ordinary skill in the art in view of these teachings. Therefore, the invention is to be limited only by the following claims which include all such other embodiments and modifications when viewed in conjunction with the above specification and accompanying drawings.

What is claimed is:

1. A servo system demodulator for converting servo burst signals representing read/write transducer head position information into digital signals, the demodulator comprising:

a gain stage, including:
   a transconductance amplifier configured to receive differential voltage signals representing servo bursts, the transconductance amplifier converting the differential voltage signals into corresponding differential current signals;
   a full-wave current rectifier, connected to receive differential current signals from the transconductance amplifier, the full-wave current rectifier outputting a rectified current signal, the full-wave current rectifier having a first forward conduction path configured to allow current flow in only a single direction defining a full-wave rectified current output having a first polarity, the full-wave current rectifier further having first and second reverse conduction paths, each path constructed as a mirror image of the other and each path configured to allow current flow in a single direction opposite the direction of the forward conduction path, each path connected to a respective one of the differential current signals of the transconductance amplifier at a first end and combined together at a second end to define a full-wave rectified current output having a polarity opposite the first polarity;
   a transimpedance amplifier connected to receive the full-wave rectified current signal, the transimpedance amplifier converting the rectified current signal into a rectified voltage signal;

an integrator circuit configured to receive the rectified voltage signal and integrate said signal so as to define a signal representing a magnitude of a servo burst; and a signal storage connected to the integrator circuit for temporarily storing signals representing servo burst magnitudes.

2. The servo system demodulator according to claim 1, the transconductance amplifier comprising first and second active voltage-to-current conversion paths, each path constructed as a mirror image of the other and each path including a voltage-follower-configured operational amplifier and transistor combination, each operational amplifier receiving a respective one of the differential voltage signals at an input, each transistor defining a respective differential current output at a drain terminal.

3. A servo system according to claim 2, wherein the first and second active voltage-to-current conversion paths are connected together by a resistor element $R_1$, the resistor element coupled between the source terminals of each respective transistor comprising each voltage-follower.

4. The servo system demodulator according to claim 3, the full-wave current rectifier further comprising a second forward conduction path, wherein each of the first and second forward conduction paths are constructed as a mirror image of the other, and wherein each path is configured to allow current flow in only a single direction, each path connected to a respective one of the differential current outputs of the transconductance amplifier at a first end and combined together at a second end to define the full-wave rectified current output having the first polarity.

5. A servo system demodulator according to claim 4, the first and second forward conduction paths of the full-wave current rectifier each comprising a series-connected pair of diode configured n-channel transistors.

6. A servo system demodulator according to claim 5, the first and second reverse conduction paths each comprising an n-channel transistor configured as a reverse diode.

7. A servo system demodulator according to claim 6, wherein each of the n-channel transistors comprising the forward and reverse conduction paths defines a voltage drop of approximately 0.7 volts, such that the total drop of a combined forward and reverse conduction path is approximately 2.1 volts.

8. A servo system demodulator according to claim 4, the transimpedance amplifier comprising an operational amplifier including a feed-back connected resistor element $R_2$ defining an amplification factor, the transimpedance amplifier having an input connected to the full-wave rectified current output of the current rectifier and converting the full-wave rectified current signal into a full-wave rectified voltage signal having a first polarity.

9. A servo system demodulator according to claim 8, wherein the polarity of the full-wave rectified voltage signal is a negative polarity.

10. A servo system demodulator according to claim 8, the gain stage further comprising a DC offset cancellation circuit, coupled to the input of the transimpedance amplifier in parallel-fashion with the current rectifier, the DC offset cancellation circuit mirroring DC leakage currents developed in the current rectifier and subtracting said leakage currents from the conduction path between the current rectifier and the transimpedance amplifier so as to minimize DC offset voltage developed across the feed-back resistor.

11. A servo system demodulator according to claim 10, the DC offset cancellation circuit comprising:

a dummy rectification circuit constructed as a mirror image of the full-wave current rectifier, the dummy rectification circuit coupled to the full-wave current rectifier by an operational amplifier configured as a voltage follower, such that DC currents developed in the current rectifier are mirrored in the dummy rectification circuit; and a dummy transimpedance amplifier block including a voltage-follower connected operational amplifier and transistor combination, the dummy transimpedance amplifier block controlling a current sink transistor connected to the rectification input of the transimpedance amplifier in operative response to the DC leakage current mirrored in the dummy rectification circuit, the current sink transistor adaptively controlled to conduct DC leakage currents developed in the rectifier away from the transimpedance amplifier input.

12. A gain stage for converting servo burst signals, including:

a transconductance amplifier which is configured to receive differential voltage signals that represent servo bursts, the transconductance amplifier converting the differential voltage signals into corresponding differential current signals;

a full-wave current rectifier connected to the transconductance amplifier such that the full-wave current rectifier receives the differential current signals from the transconductance amplifier and the full-wave current rectifier outputs a rectified current signal, the full-wave current rectifier having a first forward conduction path configured to allow current flow in only a single direction defining a full-wave rectified current output having a first polarity, the full-wave current rectifier further having first and second reverse conduction paths, each path constructed as a mirror image of the other and each path configured to allow current flow in a single direction opposite the direction of the forward conduction path, each path connected to a respective one of the differential current signals of the transconductance amplifier at a first end and combined together at a second end to define a full-wave rectified current output having a polarity opposite the first polarity;

a transimpedance amplifier connected to the full-wave current rectifier such that the transimpedance amplifier receives the rectified current signal from the full-wave rectifier and the transimpedance amplifier converts the rectified current signal into a rectified voltage signal, each of the full-wave current rectifier and the transimpedance amplifier having symmetrical mirror image signal paths;

an integrator circuit which is configured to receive the rectified voltage signal from the transimpedance amplifier and integrate the received rectified voltage signal such that a signal representing magnitude of a servo burst is generated; and signal storage means connected to the integrator circuit for temporarily storing the signal representing the magnitude of the servo burst.

13. A gain stage for converting servo burst signals as recited in claim 12, the transconductance amplifier further comprising:

a positive differential signal path;

a negative differential signal path which is a mirror image of the positive differential signal path such that the mirror image of the negative differential signal path is symmetrical with the positive differential signal path.

14. A gain stage for converting servo burst signals as recited in claim 13, wherein the symmetry of the minor image paths of the transconductance amplifier minimizes peak displacement within the gain stage.

15. A servo system demodulator for converting servo burst signals representing read/write transducer head position information into digital signals, the demodulator comprising:

a gain stage, including:

a transconductance amplifier which is configured to receive differential voltage signals representing servo bursts, wherein the transconductance amplifier converts the differential voltage signals into corresponding differential current signals;

a full-wave current rectifier connected to the transconductance amplifier to receive the differential current signals from the transconductance amplifier, the full-wave current rectifier having a forward conduction path and a reverse conduction path which is symmetrical to the forward conduction path, where the forward conduction path allows current flow in a first direction and the reverse conduction path allows current flow in a second direction opposite the first direction, wherein the forward conduction path rectifies the differential current signals and the forward conduction path of the full-wave current rectifier outputs a corresponding rectified current signal having a first polarity, and wherein the reverse conduction path comprises a first reverse conduction path and a second reverse conduction path which is a mirror image of the first reverse conduction path, the first reverse conduction path and the second reverse conduction path being individually connected to the differential current signals at a first end, and wherein the first reverse conduction path and the second reverse conduction path are combined together at a second end to define a reverse full-wave rectified current output having a second polarity that is opposite the first polarity of the forward full-wave rectified current signal; and a transimpedance amplifier which is connected to the full-wave rectifier, wherein the transimpedance amplifier receives the rectified current signal and converts the rectified current signal into a rectified voltage signal.

16. A servo system demodulator as recited in claim 15, further comprising:

an integrator circuit which is configured to receive the rectified voltage signal and integrate the rectified voltage signal such that the integrated rectified voltage signal defines a signal representing a magnitude of a servo burst.

17. A servo system demodulator as recited in claim 16, further comprising:

a signal storage connected to the integrator circuit for temporarily storing the signal representing the magnitude of the servo burst.

18. A servo system demodulator as recited in claim 15, wherein the forward conduction path comprises a first forward conduction path and a second forward conduction path which is a mirror image of the first forward conduction path, the first forward conduction path and the second forward conduction path are individually connected to the differential current signals at a first end and the first forward conduction paths and the second forward conduction paths are combined together at a second end to define a forward full-wave rectified current output having a first polarity.

* * * * *